Figure 1:
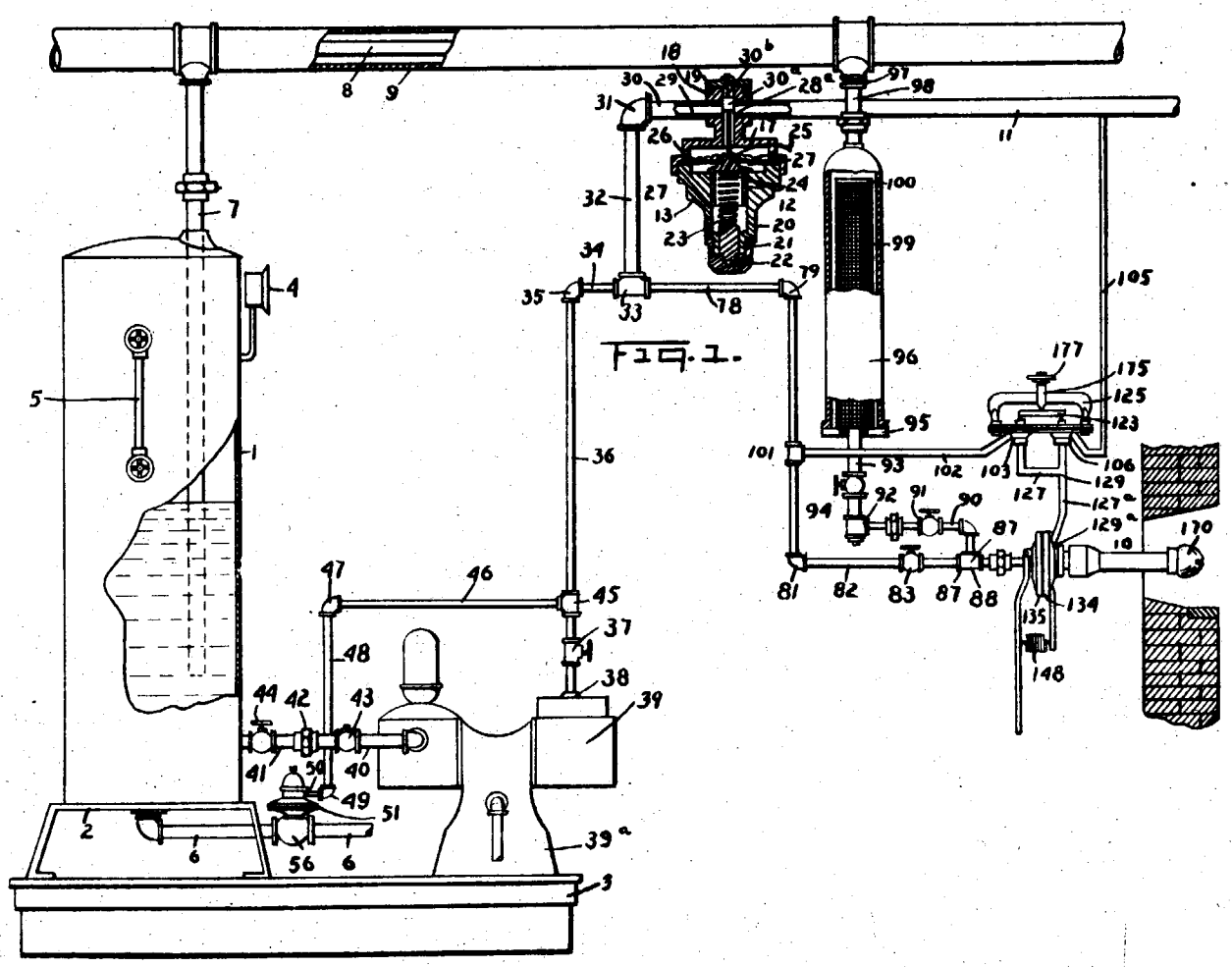

B. L. WORTHEN, DEC'D.

V. K. WORTHEN, EXECUTRIX.

APPARATUS FOR BURNING OIL.

APPLICATION FILED SEPT. 15, 1919.

Reissued Feb. 3, 1920.

14,800.

3 SHEETS—SHEET 1.

INVENTOR
BURT L. WORTHEN.
DECEASED.

BY Carlos P. Griffin
ATTORNEY

B. L. WORTHEN, DEC'D.
V. K. WORTHEN, EXECUTRIX.
APPARATUS FOR BURNING OIL.
APPLICATION FILED SEPT. 15, 1919
Reissued Feb. 3, 1920.
14,800.
3 SHEETS—SHEET 2.
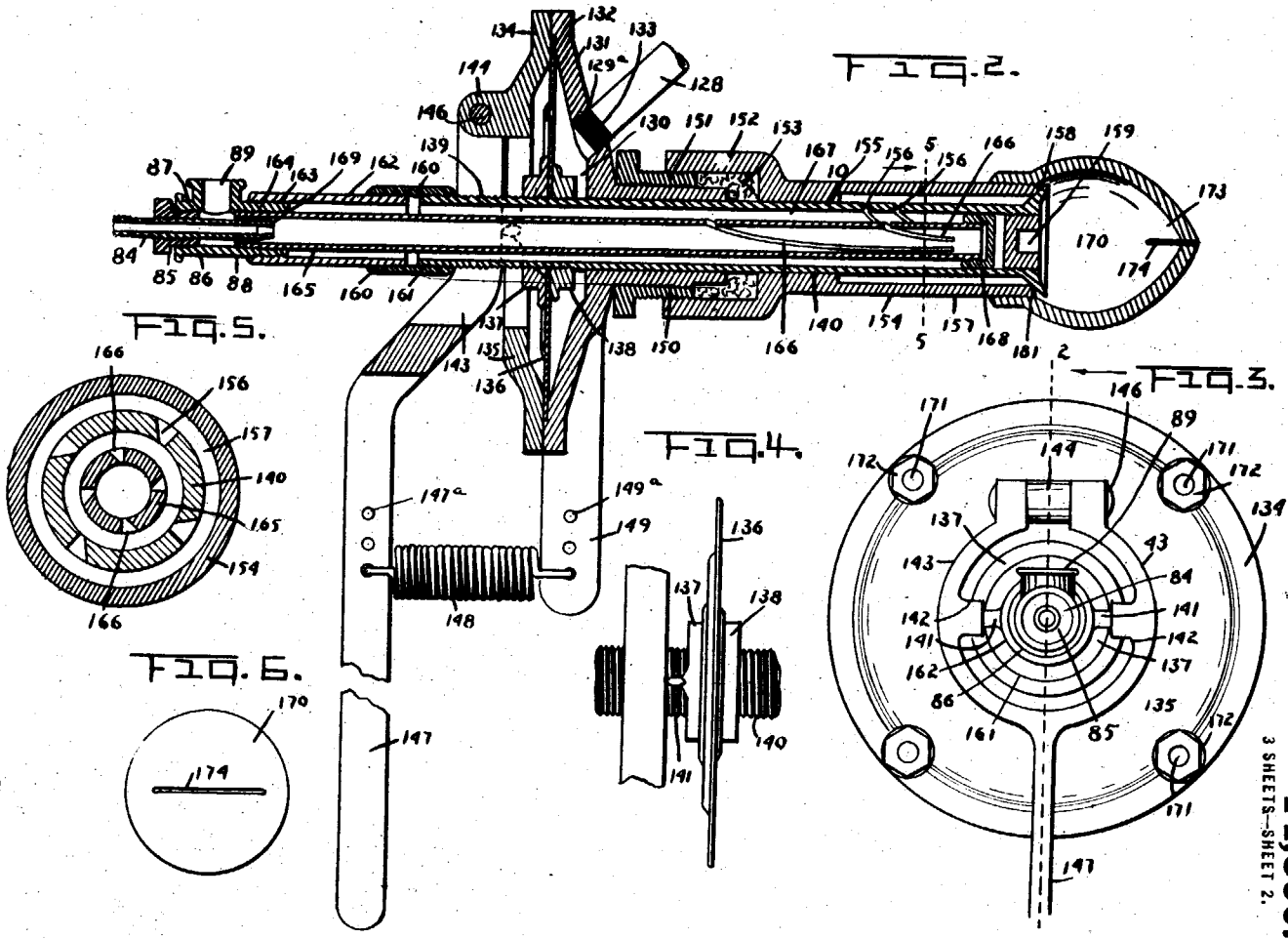
INVENTOR
BURT L. WORTHEN.
DECEASED.
BY
Carlos P. Griffin
ATTORNEY B. L. WORTHEN, DEC'D.
V. K. WORTHEN, EXECUTRIX.
APPARATUS FOR BURNING OIL.
APPLICATION FILED SEPT. 15, 1919.
Reissued Feb. 3, 1920.
14,800.
3 SHEETS—SHEET 3.
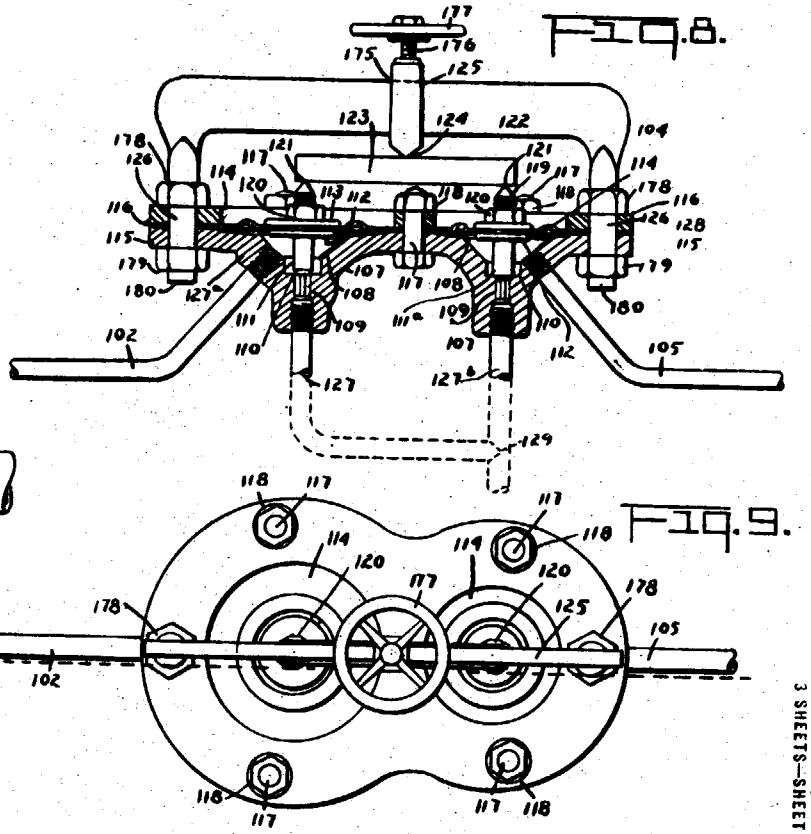
FIG. 8.
FIG. 9.
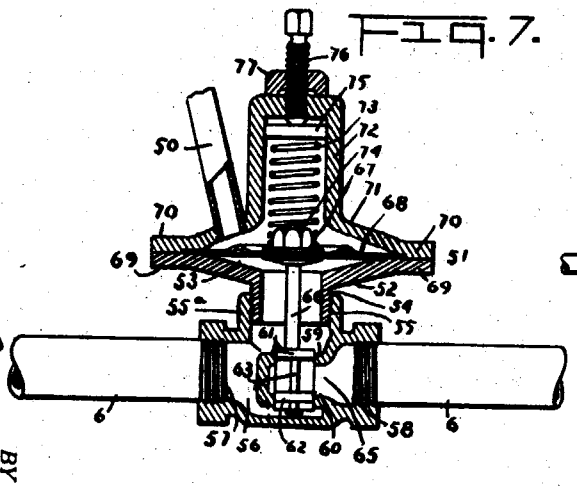
FIG. 7.
INVENTOR
BURT L. WORTHEN.
DECEASED.
BY Carlos P. Griffin
ATTORNEY

UNITED STATES PATENT OFFICE.

BURT L. WORTHEN, DECEASED, LATE OF TUCSON, ARIZONA, BY VIRGINIA K. WORTHEN, EXECUTRIX, OF OAKLAND, CALIFORNIA; SAID BURT L. WORTHEN ASSIGNOR OF ONE-HALF TO BREWSTER CAMERON, OF NEW YORK, N. Y.

APPARATUS FOR BURNING OIL.

14,800. Specification of Reissued Letters Patent. Reissued Feb. 3, 1920.

Original No. 1,050,193, dated January 14, 1913, Serial No. 279,626, filed September 22, 1905. Application for reissue filed September 15, 1919. Serial No. 323,993.

*To all whom it may concern:*

Be it known that BURT L. WORTHEN, late a citizen of the United States, and a resident of Tucson, in the county of Pima, State of Arizona, now deceased, invented a new and Improved Apparatus for Burning Oil, of which the following is a full, clear, and exact description.

This invention relates to apparatus for burning oil, and it consists substantially in the improvements hereinafter more particularly described and pointed out in the claims.

The invention has reference more especially to apparatus for burning oil for heating purposes, as, for instance, for heating water in a boiler for the generation of steam therein, and one of the principal objects of the invention is to provide an apparatus of this kind wherein oil may be burned at definite or predetermined regulated pressures.

A further object is to provide an apparatus of the character referred to which is entirely automatic or self-controlling in operation, and which is also effective and reliable for its purposes, besides possessing the capacity for long and repeated service.

A still further object is to provide an apparatus of this kind of an embodiment to overcome numerous disadvantages and objections frequently encountered in the use of many other apparatus hitherto devised for similar purposes.

The above and additional objects are attained by means substantially such as are illustrated in the accompanying drawings forming a part of this specification, in which similar reference characters denote similar parts in all the views.

Figure 1 is a part sectional side elevational view of an oil-burning apparatus embodying my improvements, the reducing valve being considerably enlarged for the purpose of illustration; Fig. 2 is an enlarged longitudinal sectional view on the line 2—2 of Fig. 3 of the burner-structure of the apparatus together with auxiliaries thereto, including a device for automatically operating a member thereof on variations of pressure of the boiler-pressure steam; Fig. 3 is an end view looking from the left of Fig. 2; Fig. 4, is a detail view to more clearly indicate the construction and operation of certain elements of the operating device for the movable element of the burner-structure; Fig. 5 is a transverse sectional view taken on the line 5—5 of Fig. 2; Fig. 6 is an end view of the burner proper, looking from the right of Fig. 2; Fig. 7 is an enlarged vertical sectional view in detail of the pressure-relief devices associated with the oil tank and either the pump or source of supply of oil to the tank; Fig. 8 is a similar view of the normally-balanced controlling devices, through the medium of which the admixture of oil and steam is conducted to the operating devices for the burner at any desired working-pressure at which the admixture is to be burned; and Fig. 9 is a top plan view of the structure shown in Fig. 8.

Before proceeding with a more detailed description, it may be stated that in the form of my improvements herein shown, I employ a tank having connection with a suitable source of oil-supply, and associated with which is a pump for forcing the oil thereinto. I also employ a pipe or conduit leading from a suitable source of steam supply, as for instance, a boiler heated by the flame, at the burner of the apparatus, through which steam is conducted, say at 100 pounds pressure, and a reducing valve suitably disposed within said pipe or conduit, by means of which the steam is reduced to a working pressure, say of 60 pounds. Special means are employed for conducting some of this working-pressure steam to the pump for operating the same to continuously force the oil from the tank at the same pressure (less that allowed for overcoming friction and ordinary resistances) through another pipe or conduit therefor and a specially devised strainer for the oil, special relief devices being employed between the tank and the pump (or between the tank and the source of oil supply thereto) for any excess of pressure of oil within the tank, as will hereinafter be explained. Further special means are employed for conducting some of the working-pressure steam to an injector oppositely disposed with reference to suitable outlet connections from the strainer for the oil, it being mentioned that during the passage of oil from the tank to said strainer, the same is heated prior to its entrance to the strainer preparatory to its atomization by the steam from said injector. Some of the boiler pressure steam (at 100 pounds pressure) is conducted to one side of specially constructed devices for automatically controlling the supply of the admixture of oil and steam to the burner structure, while some of the working pressure steam (at 60 pounds pressure) passes to the other side thereof, thus to balance said devices in such manner that the admixture will be continuously delivered to specially constructed operating devices, for a specially constructed burner employed in connection with the apparatus, the organization of the severally recited elements being such that the working-pressure at the burner is maintained constantly uniform irrespective of variations of pressure of steam from the boiler side of the apparatus. The apparatus is entirely automatic in character, and while I have herein represented the same in a certain preferred embodiment, it will be understood, of course, that variations therefrom may be made and still come within the scope of my invention.

Reference being had to the drawings by the designation of characters thereon, 1 represents a suitably located tank preferably mounted on a support 2 on a suitable base 3, and which is provided at one side thereof with a pressure-gage 4 and a level-indicating gage 5. The said tank is connected at the bottom thereof by means of a return pipe or conduit 6 with a suitable source (not shown) of oil supply thereto, while leading from the interior of the tank, a suitable distance from the bottom thereof, is a pipe or conduit 7 having communication with a pipe or conduit 8 inclosed or centrally disposed within a larger pipe or conduit 9 having connections say with the exhaust valve of an engine for heating said pipe or conduit 8.

Leading from a suitable source of steam supply (not shown) as, for instance, a boiler heated by the flame at the burner-structure 10 of the apparatus, is a pipe or conduit 11 provided at a suitable point thereof with a reducing valve 12 of any preferred construction, but which is herein represented as comprising a casing 13 having a removable cap or cover 17, provided with a tubular extension 18 having a removable screw-cap 19. The said casing of the valve terminates downwardly in a sleeve 20, which is internally threaded to receive an adjusting plug 21, and externally threaded to receive a cap 22 which protects the plug. A pressure-spring 23 is empolyed within the casing with the lower end thereof resting upon the adjusting plug 21 and its upper end encompassed by a socket 24 terminating in a stud-post 25, upon which rests a corrugated diaphragm 26, the peripheral edge portion of which is clamped in the usual manner between the casing 13 and the cap or cover 17. The stud-post is formed circumferentially with a groove to receive the inner edges of sectors 27 which form a sectional diaphragm, the outer edges of which rest upon a shoulder 28 formed in the upper part of the said valve-casing 13. This sectional diaphragm entirely encompasses the lower face of the corrugated diaphragm, so as to form a shield when an excessive pressure is employed, and prevent rupture of the latter. The tubular extension 18 of this reducing valve is provided with an inlet at $28^a$ at which communication of the pipe or conduit 11 is established with the reducing-valve, while opposite said inlet $28^a$ is an outlet 29, from which leads a pipe or conduit 30. A piston $30^a$ is controllable by flexing of the diaphragm 26, and is pressed upon by a neck spring $30^b$. The conduit 30 is virtually a continuation of the said pipe or conduit 11, having an elbow connection at 31 with a downwardly disposed continuation 32, 33, 34, 35 and 36 thereof, provided with an ordinary hand-operated valve 37, and at 38 with one of the cylinders of an ordinary force pump 39, the other cylinder of which is in communication with the lower part of the aforesaid tank 1 by means of pipe or conduit sections 40 and 41, coupled or otherwise joined at 42, and having suitable valves 43 and 44, as indicated very clearly in Fig. 1. The said downwardly disposed continuation 36 of the said pipe or conduit 34 has communicating therewith at 45 an end of a branch pipe or conduit 46, the other end of which has coupled relation at 47 with a downward continuation 48 thereof, the lower end of which is in coupled relation at 49 with a short pipe or conduit 50, having communication with the interior of a casing 51 of relief-devices for excessive pressure of oil within the tank 1, said devices being shown enlarged in Fig. 7, and wherein it will be noted that, merely for the sake of convenience, the short pipe or conduit 50 is represented as being on the opposite side of the casing 51 to that represented in Fig. 1, and also as disposed somewhat at an inclination from the vertical rather than in a horizontal position, as in Fig. 1. Said relief-devices may be constructed in various ways, but preferably I have represented them herein as comprising a lower section 52 recessed or hollowed out in the upper surface thereof at 53, and having pendent therefrom a tubular neck 54, which is reduced in external diameter at 55 and threaded to receive a corresponding inner threaded member $55^a$ leading from one of the walls of a valve-chamber 56 seated within and having communication at 57 and 58 with the main pipe or conduit 6 of Fig. 1. Interiorly of the said chamber 56 is a by-pass structure comprising upper and lower seats 59 and 60 for the disks 61 and 62 of a double valve 63, having vertically guided movement in said seats, it being noted (see Fig. 7) that the latter are connected together, thus practically closing at one end what may be termed a passage 65, constituted by the aforesaid seats 59 and 60. The said double valve 63 is provided with an upwardly extending stem 66 provided with suitable disks or other means 67 for clamping therebetween the central portion of a flexible corrugated diaphragm 68, the peripheral portions of which are held between the flange 69 of the said section 52 of the relief devices and a corresponding flange 70 forming an integral part of the upper section 71 of said casing, this last-named section terminating upwardly with a hollow dome 72, in which is located a spring 73, the lower portions of which are seated about a nut 74 located on the upper threaded end of the valve-stem 66 for tightening the aforesaid disks 67 upon the said diaphragm 68, the pressure of said spring being under the control of a disk 75 carried at the inner end of a screw 76 working in an opening therefor in the top of the said hollow dome 72, as well as in another opening therefor formed within a nut 77 seated upon the said top of the dome.

It will thus be seen in what manner these devices may be adjusted, or set to be operated in accordance with varying predetermined pressures to be placed upon the oil within the tank. Also having coupled relation at 33 with the hereinbefore mentioned downwardly disposed continuation 32 of the pipe or conduit 78, in coupled relation with which at 79 is the upper end of a downwardly-disposed extension 80 thereof, to the lower end of which is coupled at 81 a horizontally disposed pipe or conduit 82 provided with a suitable hand-operated globe or other valve 84 (see Fig. 2) threaded to fit the interior of a flanged follower 85, the exterior of which is threaded at 86 and receive in the correspondingly internally threaded member 87 of a coupling 88, the upper hollow member 89 of which is in communication with one end of a pipe or conduit 90 provided with a suitable ball or other valve 91, and being preferably formed of coupled sections, and also having communication at 92 with the lower end of an outlet pipe 93 provided with a suitable globe or other valve 94, and leading from the bottom 95 of the casing 96 of a strainer for the oil which is forced from the tank 1 into the aforesaid pipe or conduit 7 and thence to the pipe or conduit 8 having communication at 97 with a short pipe section 98, leading therefrom to the upper end of the said casing 96 of the strainer. Within this casing 96 is located a tubular section 99 of wire gauze or other reticulated material, which is closed at the top by means of a cap 100 and open at the bottom, and having the lower edge thereof seated upon the aforesaid bottom 95 of the casing, see Fig. 1.

Communicating at 101 with the hereinbefore mentioned downwardly disposed continuation 80 of the pipe or conduit 78, is one end of a branch pipe or conduit 102, the other end of which is in communication at 103 with devices indicated in entirety at 104, for controlling through pipe 127[b], the pressure upon the diaphragm 136, and in this manner controlling the general position of the tube 140 so as to regulate the flow of an admixture of steam and oil into the tube 165, the admixture having already passed at a predetermined pressure through valves 83 and 91. The admixture is rendered thoroughly homogeneous in the tube 165. Leading from the hereinbefore mentioned pipe or conduit 11 is a downwardly disposed branch pipe or conduit 105 having communication 106 with the opposite side of said devices 104, it being understood that steam at boiler-pressure (100 pounds) is conveyed to these devices by the said pipe or conduit 105, while steam at working pressure (60 pounds) is admitted thereto through the said branch pipe or conduit 102.

The controlling devices 104 may be constructed in various ways, but preferably herein comprise practically duplicate sections 107, each hollowed out or recessed at the upper surface 108 thereof and formed with an outlet opening 109, the upper edge 110 of which constitutes a seat for a vertically operating valve 111 or 111[a] carrying thereon a set of disks 112 and 113, between which is clamped the central portion of a flexible corrugated diaphragm 114, the peripheral portions of which are clamped between a flange 115 of the said section 107 and a ring 116 secured to said flange by means of headed bolts 117 and fastening nuts 118 screwing on ~~the~~ upper projecting threaded extremities thereof, as indicated more clearly in the enlarged detail view, Fig. 8, it being noted that said bolts are properly distributed with reference to each other, and also that the upper threaded portion 119 of each valve 111, 111[a] is provided with a nut 120, for tightly securing the said disks 112 and 113 in clamped relation with said flexible corrugated diaphragm 114. The available lower surface of the disk 112 is of greater area than the available lower surface of the disk of the other set, and in consequence of differences in the areas of the two diaphragms in question, the two valves 111, 111[a] may be said to be differential in character. The upper end of each of said valves is preferably tapered to a knife-edge at 121, and resting thereon is one end-portion of the bottom surface 122 formed on a connecting member 123 between the two said valves and centrally of the upper edge of which bears another knife-edge 124 centrally disposed with reference to a yoke 125, the threaded terminals 126 of which may be supported in any suitable manner from the hereinbefore mentioned rings 116, as applied to the flanges of the two sections 107 of the hereinbefore mentioned controlling-devices 104.

In Fig. 8, it will be seen that the extremity of the branch pipe or conduit 102 which enters the controlling devices at 103 as already mentioned, is threaded at 127[a] for insertion in a correspondingly threaded opening therefor in one of the sections 107 of the said controlling devices, while the end portion of the branch pipe or conduit 105 for the boiler pressure steam is similarly threaded at 128 to be received in a correspondingly threaded opening therefor in the other one of said sections 107 of the controlling devices. Screwing into the openings 109 in the said sections 107 of the controlling devices 104 referred to are by-pass pipes 127 and 127[b] having communication with each other at 129, the lower end of the said by pass pipe being in communication at 129[a] with the interior 130 of a casing 131, having an annular flange 132, it being noted (see enlarged detail, Fig. 2) that the lower portion of said pipe 127[b] is threaded at 133 and fitted in a correspondingly threaded opening therefor in the said casing. This casing may be said to constitute one of the members of the devices for operating the burner of the apparatus, and confined between the annular flange 132 thereof and a corresponding flange 134 of a ring 135, are the peripheral portions of a flexible corrugated diaphragm 136, the central portion of which is tightly held between two clamping members 137 and 138, centrally threaded and mounted upon the externally threaded portion 139 of a longitudinally movable inner tube 140 of the burner structure 10 hereinbefore referred to. Formed with the said clamping member 137 at opposite sides thereof are projections 141 which are in engagement with correspondingly disposed inner projections 142 of the curved sections 143 of a yoke, which is pivoted to a projection 144 of the ring 135 by means of a pivot-bolt 146 (see Figs. 2 and 3), said curved sections of the yoke merging into a downwardly disposed member 147, which is connected by means of a spring 148 with a member 149 pendent from and rigid with the hereinbefore mentioned casing 131. The said inner tube 140 of the burner-structure 10 is slidably supported within a hollow extension 150 leading from the casing 131 of the operating devices for the burner, the outer surface of said extension being screw-threaded and having fitted thereon a flanged follower 151, the external surface of which is screw-threaded and has fitted thereon what may be termed a stuffing-box 152, within which is contained suitable packing 153, said stuffing-box being formed with an extension 154 forming at 155 another support for the said inner tube 140, attention being called to the fact that the latter is formed in the sides thereof with one or more spirally-disposed slots 156, which lead to or are in communication with an annular space 157 existing between the greater portion of the above-mentioned extension 154 of the stuffing-box 152 and the said inner tube. The operative end of this latter tube is formed or provided with a deflector 158, and seated within the adjacent end thereof is a closing-plug 159. The other end of the tube in question has rigid relation with a guide or collar 160 screwed thereon at 161, and which is slidable upon a stationary tubular section 162, threaded at 163 and screwed upon a correspondingly threaded extension 164 of the hereinbefore mentioned coupling 88. Screwed into this extension 164 is an end of a third or innermost tube 165, which is stationary and which is formed forwardly of the sides thereof with one or more spirally disposed slots 166 having communication with an annular space 167 between this third or innermost tube and the aforesaid longitudinally movable tube 140. The opposite end of the said third or innermost tube 165 is closed by a cap 168, and it will be noted that at the supported end thereof the hereinbefore-mentioned injector 84 projects thereinto for a suitable distance, the external diameter of this injector being somewhat less than the internal diameter of the tube, thus providing a space 169 between the two, through which the oil is forced interiorly of the tube by the steam passing out of the adjacent end of the injector. It will thus be seen that an admixture of the oil and steam is derived at this point of the burner-structure, and also that said admixture is forcibly driven within the third or innermost tube 165 in such manner as to thoroughly break up or disintegrate the oil for effective burning thereof at the burner proper 170 of the burner-structure. The force of the steam diven into the third or innermost tube 165 is such that the admixture is caused to be forcibly driven out of this tube through the spirally-disposed slots 166 therein, and thence to the space 167 intervening between the tube in question and the above-mentioned longitudinally movable tube 140, from which space the admixture is similarly forced into the space 157 between the extension 154 of the stuffing-box 152 and the tube 140, through the aforesaid spirally-disposed slots 166 in the said latter tube.

By referring to Fig. 3, it will be observed that the flange 134 of the ring 135 is secured to the flange 132 of the casing 131 of the operating devices for the movable tube 140 of the burner-structure by means of bolts 171 fitted with suitable fastening nuts 172; and it will further be observed that the burner proper 170 is preferably formed at the tapered end or nose 173 thereof with a straight-sided elongated flame-orifice 174. At this point it may also be stated that the hereinbefore-mentioned knife-edge 124 is preferably formed on a slide 175 mounted on the yoke 125 (see Fig. 8) and provided with an adjusting or tightening screw 175, having a hand wheel 177 for turning the same, by which to secure the slide firmly upon the yoke at a point ascertainable by trial, as described below on which the connecting member is supported. The legs or terminals 126 of said yoke 125 are provided with stop-nuts 178, and they pass through suitable corresponding openings therefor in the rings 116, and the flanges 115 of the sections 107 of the controlling devices 104, suitable nuts 179 being applied to the threaded end-portions 180 of the said legs or terminals 126.

It will be understood that the slide 175 carrying the knife edge 124 is movable along the yoke 125 so as to find a suitable fulcrum for establishing a balance between the valves 111 and 111[a]. This permits the readjustment of the device so as to accommodate it to any possible desired change in boiler pressure or any reduction in boiler pressure. The slide 175, after being properly adjusted upon the yoke, is clamped in place by the screw 176. The hand wheels 177 through the agency of the screw 176 locks the slide 175 to the yoke 125. The legs or terminals 126 of the yoke 125 are screw-threaded and fitted with adjusting nuts 178, 179, thereby providing means for increasing or diminishing pressure upon the knife edge 124, thereby allowing of adjustment of lift for valves 111, 111[a]. It may also be mentioned at this point, that the hereinbefore-mentioned extension 154 of the stuffing-box 152 constitutes the outer stationary tube of the burner-structure, the outer end thereof being formed with a straight outward bevel, as indicated at 181, which lies directly adjacent to the corresponding straight surface of the hereinbefore-mentioned deflector 158.

It will be seen that steam at a predetermined pressure is used for operating the oil pump and is supplied to the burner structure through the accumulating tank and strainer. As the condition of the burner structure varies it is apparent that at times there will be an excess of oil pumped into the tank 1. It is desirable therefore, to provide means which either vary the speed of the pump or discharge of excess of oil. I therefore use the relief valve 51 which serves to pass the excess of oil back to the source of supply. The action of the relief valve 51 is controlled by reduced pressure of the casing 71 through pipe 50 and acting upon the diaphragm 68. As this pressure is exerted upon the side of the diaphragm opposite to that upon which the oil pressure enters through the pipe 6, it may be seen that a reduced steam pressure must control the pressure of oil in the tank 1. Moreover, should there be any variation in the reduced steam pressure, the oil pressure will be maintained at the same pressure as the steam. This occurs through the action of the steam pressure upon the diaphragm 68 for the reason that the raising of the balanced valve 63 instantly passes any excess of oil. The spring 73 has no function unless it be desired to carry a higher pressure of oil for the purpose of overcoming friction and in this event, by adjusting the tension of the spring the oil pressure may be increased. By this control there is always a perfect combining of steam and oil in the tube 165 regardless of the amount passing through at the orifice. It will then be seen that the burner structure and the fuel feeding device co-act with each other in a common purpose.

From the foregoing, it will be seen that the steam at boiler pressure (say 100 pounds) on passing through the pipe or conduit 11 therefor to the reducing valve 12 withing said conduit, will be reduced to the desired working pressure (say 60 pounds), and some of this working pressure steam will be conveyed by the downwardly disposed continuation 32 of the pipe or conduit 30 to the pump 39 via the downwardly-disposed continuation 36 of the pipe or conduit 34, and thus will the said pump be operated at substantially the same pressure to force the oil from the tank 1 at a higher pressure through the pipe or conduit 7 leading thereinto from the top, whence this oil will be conveyed through the pipe or conduit 8 to the strainer 96 therefor, and on entering the strainer interiorly of the tubular reticulated section 99, the oil will pass through the meshes thereof and be strained, and will thence pass to the coupling 88, wherein the oil is encountered by the steam from the injector 84, thus to form a combustible admixture of the oil and steam in the manner and for the purposes hereinbefore set forth. Prior to its entrance within the strainer, the oil is heated by means of exhaust steam passing through the inclosing pipe or conduit 8, and meanwhile some of the working pressure steam is also being conveyed to the injector. At the same time, some of the working-pressure steam is conveyed by means of the branch pipe or conduit 102 to the controlling-devices 104 at one side thereof, as already explained, and simultaneously therewith some of the boiler-pressure steam is supplied to said controlling-devices at the other side thereof via the pipe or conduit 189

105 leading from the said pipe or conduit 11 at a point in advance of the connection with this latter pipe or conduit of the said reducing-valve 12. In view of the differential character of the inner movable elements of the said controlling-devices, it is apparent that normally right-hand valve 111[a], will be down or lowered upon its seat, and that there will be perfect balance between said valves, by which to constantly maintain the desired pressure of the working-pressure steam. Normally the longitudinally-movable tube 140 of the burner structure may be said to be in such position that the space between the deflector thereof and the corresponding beveled edge 181 of the stationary outer tube (or extension 154 of the stuffing-box 152) is slightly open, the position of the corrugated flexible diaphragm 136 of the operating-devices for the movable tube being at this time substantially in the position indicated in Fig. 2. Under these conditions, the combustible admixture will be delivered to the burner proper 170 under the desired working-pressure of 60 pounds (less that allowed for overcoming friction and ordinary resistances in the working of the movable tube of the burner structure), and whenever there is an increase of the boiler-pressure steam in the controlling-devices 104 for the operating devices for the burner-structure, it is apparent that right valve 111[a] (carrying the smaller set of differential disks 112 and 113) will be opened, whereupon the effect of the working-pressure steam entering from the other side of the controlling-devices 104 is to exert sufficient force upon the flexible corrugated diaphragm 136 as to cause the movable tube 140 of the burner-structure to be moved to a greater extent within the burner proper, thus to decrease the extent of the space between the deflector of said tube and the aforesaid beveled end of the stationary tube 154. In this way, the admixture will be delivered to the burner proper in a manner to still maintain the desired pressure of the working-pressure steam, and it will be understood that by the described movement of the said tube 140, the spring 148 between the member 147 and the member 149 of the casing 131 is placed under distention. If, on restoration of normality between the boiler-pressure steam and the working-pressure steam, there should be a decrease of pressure of the latter, the operation of the parts referred to will be exactly the reverse, as will be understood, to still maintain the working-pressure steam at the desired pressure, the spring 148 at this time reacting, due to the force exerted against the opposite side of the flexible diaphragm 136, which in turn is communicated to the said movable tube 140 through the medium of the clamping members for said diaphragm.

The operation of the several parts of the apparatus described is entirely automatic, and it will be apparent that the parts may be so adjusted as to effect the burning of the combustible admixture at any desired working-pressure.

The main purpose of the valve 104 is explained as follows: At some period there may be a balance between the valves 111, 111[a], however, all varying steam pressure of the boiler will disturb this balance and throw the valve 104 into action. As a reducing valve controls the pressure in pipe 102, it follows that the reducing valve must also have a tendency to control the pressure at the seat 10, and as this reducing valve always has a demand upon it for steam and as the pump and burner are always drawing steam, there can be no accumulation of pressure upon the side of the reducing valve opposite that fed by the boiler-pressure. With the reversing movement due to lowering the boiler-pressure, the valve 111[a] is forced to its seat by the reduced pressure acting against the diaphragm 114; with the closing of the valve 111[a] and the opening of the valve there is a release of the excess of pressure of the common diaphragm 136 of the burner structure. The excess of pressure finding passage at the seat 110 is within limited time reduced to a predetermined pressure, say 60 pounds. As this reduction takes place there is reaction of the spring 148 through its connecting devices. This causes the valve tube 140 to move forward enlarging the opening at 156, the member 181 thereby admitting an equivalent quantity of gaseous admixture to the nose-piece 173, the result being that the heat under the boiler is increased. As the steam pressure of the boiler is raised, a reversing of the valves 111 takes place with the result that boiler pressure steam is again admitted to diaphragm 136, which, by moving the tube 140, diminishes the quantity of combustible admixture admitted into the nose-piece 173 with the same result as before. All this takes place with a view of maintaining the steam pressure as near constant as possible. The operation of the device before mentioned is further rendered approximately constant by the use of reduced pressure which permits of maintaining a constant non-varying pressure of both steam and oil in the combining tube 165.

Both the pressure and height of the oil within the tank 1 may be ascertained at any time by a simple inspection of the gages with which said tank is provided, and it is apparent that by means of the disk 75 and the operating-screw 76 thereof, the tension of the spring 73 may be increased or diminished as may be desired in practice. Whenever the pressure within the tank 1 exceeds the desired working pressure (60 lbs.), it is apparent that the pressure-relief devices for the tank will be operated in the manner already set forth, and that the working pressure of either the oil or the steam will not be affected in any manner thereby, but still maintained constant, as is the purpose.

The reducing valve 12 herein employed is of ordinary embodyment, hence any further specific description of its operation is not deemed necessary herein. The connection for the pump 39 to the source of oil supply (not shown) is indicated at 39[a], Fig. 1.

In further explanation it may be stated that the conduit 50 conveys steam at the working pressure of 60 pounds to the upper face of the diaphragm 68, thereby holding the double valve 63 closed until the oil pressure on the opposite side of said diaphragm either equalizes or slightly overcomes said working-pressure, any excess of oil-pressure causing said valve 63 to open and thus permitting the excess of oil to be carried back either to the pump or to the tank for supplying the oil.

Referring back to the knife-edge 124, it may be stated that the same is adjusted by moving the slide 175 along the yoke 125 so as to find the exact point of balance for the valves 111, 111[a] at the time when the boiler pressure and working pressure of the steam is 100 pounds and 60 pounds respectively on the diaphragms 114. The pressure of the yoke 125 upon the lever 123 is adjustable vertically by means of the nuts 178 and 179 working on the threaded legs or terminals 126 of the yoke, thereby giving proper lift to the valves 111. As the right hand valve 111[a] is raised by steam at boiler pressure (100 pounds), the left hand valve 111 is forced upon its seat 110, thereby closing the passage between the conduit 102 and pipe 127, whereupon the boiler pressure steam becomes active on the diaphragm 136.

It will be understood that the working-pressure steam is constant, it being the purpose of the reducing valve to so maintain it, while any reduction of boiler pressure steam is properly controlled by the devices therefor as the diaphragm 114 at the left operates by working pressure steam at 60 pounds and forces the right hand valve 111[a] to its seat, shutting off boiler-pressure and at the same time the left hand valve 111 opens passage between the conduit 102 and pipe 107, allowing boiler pressure steam then acting on the diaphragm 136 to equalize with the working pressure steam, this reduction of pressure allowing the reaction of the spring 148 to force the tube 140 forward and open the space between the deflector 180 and the bevel 181 at the end of the outer tube 154.

The spring 148 may be provided with any preferred means for adjusting the tension of the same, and it will be noted that the members 147 and 149 are provided with corresponding openings 147[a], and 149[a] respectively for enabling the position of the spring to be changed by which to derive a difference of tension and leverage in the event of there being any change of pressure of the boiler pressure steam.

Having thus described this invention, I claim as new and desire to secure by Letters Patent:

1. An apparatus for burning oil, comprising a conduit for supplying high pressure steam, a burner structure connected with said conduit and provided with regulating mechanism controllable for purposes of regulation by variations in said high pressure steam, a reducing valve connected with said conduit, a pipe for delivering steam at low pressure from said reducing valve to said burner structure for the purpose of supplying steam to the burner flame, and mechanism for controlling the flow of steam at high pressure from said conduit to said regulating mechanism.

2. An apparatus for burning oil, comprising a burner, an oil supply connected therewith, a reducing valve, means for supplying steam through said reducing valve to said burner, and mechanism controllable by the joint action of steam having substantially the same pressure as steam supplied to said reducing valve, and steam having its pressure reduced by the passage of said steam through said reducing valve, for controlling the supply of steam directly to said burner.

3. The combination of a burner, a fuel supply connected therewith, a steam supply, a reducing valve connected therewith and having a high pressure side and a low pressure side, a connection from said low pressure side to said burner for supplying steam to the latter, regulating mechanism for controlling said burner, and means for actuating said regulating mechanism, said means being controllable partly by the action of steam at substantially the pressure of said steam supply at said high pressure side, and partly by the action of steam supplied from said low pressure side of said reducing valve.

4. The combination of a burner structure provided with a stationary portion and with a movable portion forming therewith a discharge nozzle of variable capacity, a pressure controlled member for actuating said movable portion relatively to said stationary portion in order to regulate the capacity of said burner structure, a pipe for supplying steam, a reducing valve connected therewith and having a high pressure side and a low pressure side, and means controllable partly by steam from the high pressure side of said reducing valve and partly by steam from the low pressure side thereof for actuating said pressure-controlled member.

5. An apparatus for burning oil, comprising a burner provided with steam controllable regulating mechanism, a high pressure steam pipe, a low pressure steam pipe, means controllable by the joint action of steam from said high pressure steam pipe and said low pressure steam pipe for controlling the pressure of steam supplied to said regulating mechanism, and a connection from said low pressure steam pipe to said burner for supplying steam to said burner.

6. An apparatus for burning oil, comprising a supply, a reducing valve having a high pressure side and a low pressure side, means for supplying steam thereto, a burner having a variable capacity, a pressure controlled member for varying said capacity, and means controllable jointly by steam at high pressure and steam at low pressure for actuating said means in order to regulate said burner.

7. An oil burning system having in combination a boiler furnace, an oil pump, a steam governor therefor, a burner, a steam pipe leading thereto for supplying it governed steam, an oil pipe extending to the burner, and a steam controlled governor for regulating the oil supply.

8. An oil burning system having in combination a boiler furnace, an oil pump, a steam regulator therefor, operated by boiler steam pressure, a burner, a steam pipe for supplying governed steam to the burner, an oil pipe extending to the burner, and a steam governor for controlling the supply of oil to the burner.

9. An oil burning system having in combination a boiler furnace, an oil pump, a diaphragm steam governor therefor, an oil burner, a steam pipe for supplying the burner with governed steam, an oil pipe extending to the burner, a governor for controlling the supply of oil to the burner and a diaphragm governor for controlling the escape of oil and steam at the burner.

10. An oil burning system comprising a boiler furnace, an oil pump, a steam governor to regulate the pump, an oil burner having steam and oil pipes leading thereto, and a diaphragm governor for controlling the escape of steam and oil at the burner.

11. An oil burning system comprising a boiler furnace, a steam pump, a steam governor therefor, an oil burner having oil and steam passages, a steam pipe connected to the burner for supplying it governed steam, an oil pipe connected with the burner, a steam regulator for regulating the oil supply to the burner and a steam governor for regulating the discharge of steam and oil from the burner, the latter controlled by direct boiler pressure.

12. In an oil burning system, a furnace, an oil pump, an oil burner for the furnace, oil and steam pipes connected therewith, and three diaphragm regulators for regulating the pump, the oil feed and the steam feed by steam pressure upon the diaphragms.

13. In an oil burning system, a furnace, an oil burner therefor, an oil pump, a governor therefor, oil and steam pipes connected to the burner, a steam governor for the oil supply, and a steam governor to regulate the quantity of steam escaping from the burner.

14. In an oil burning system a furnace, an oil burner therefor, an oil pump, a steam governor for the oil pump, oil and steam pipes extending to the burner, a governor for the oil supply, and a governor to regulate the steam escaping.

15. In an oil burning system, a furnace, an oil burner therefor, an oil pump, a governor therefor, steam and oil pipes extending to the burner, a steam actuated diaphragm governor for the oil supply, and a steam actuated diaphragm governor for the steam escaping from the burner.

16. In an oil burning system, a furnace, an oil burner therefor, an oil pump, steam and oil pipes leading to the burner, diaphragm governors for the control of the pump and oil supply to the burner, and a diaphragm governor to further control the escaping steam and oil at the burner.

In testimony whereof I have hereunto set my hand this 24th day of July, A. D. 1919.

VIRGINIA K. WORTHEN,
*Executrix of Burt L. Worthen, deceased.*